United States Patent [19]

St. Hillaire

[11] 4,410,197

[45] Oct. 18, 1983

[54] SHAFT ASSEMBLY FOR EXTENDING THE HEIGHT OF THE STEM OF A BICYCLE FORK

[76] Inventor: Raymond P. St. Hillaire, 9 Assabett St., Maynard, Mass. 01754

[21] Appl. No.: 322,645

[22] Filed: Nov. 18, 1981

[51] Int. Cl.³ .................... B62K 21/16; B62K 21/22
[52] U.S. Cl. .................................. 280/279; 74/551.1
[58] Field of Search ............ 280/279; 74/551.1, 551.3, 74/551.4, 551.6

[56] References Cited

U.S. PATENT DOCUMENTS 3,556,557 1/1971 Blair ................................... 280/279
4,113,395 9/1978 Pawsat et al. ...................... 280/279

FOREIGN PATENT DOCUMENTS 613942 12/1926 France ............................... 280/279

Primary Examiner—Joseph F. Peters, Jr.
Assistant Examiner—Kenneth R. Rice

[57] ABSTRACT

A device is provided for extending the height of the stem of a bicycle fork for the purpose of increasing the height adjustability for the handle bar neck. The device consists of an extender shaft threaded to the top of the fork stem and an inner reinforcing rod which extends through axially aligned passages in the extender shaft and stem and locks into engagement with each member.

10 Claims, 2 Drawing Figures

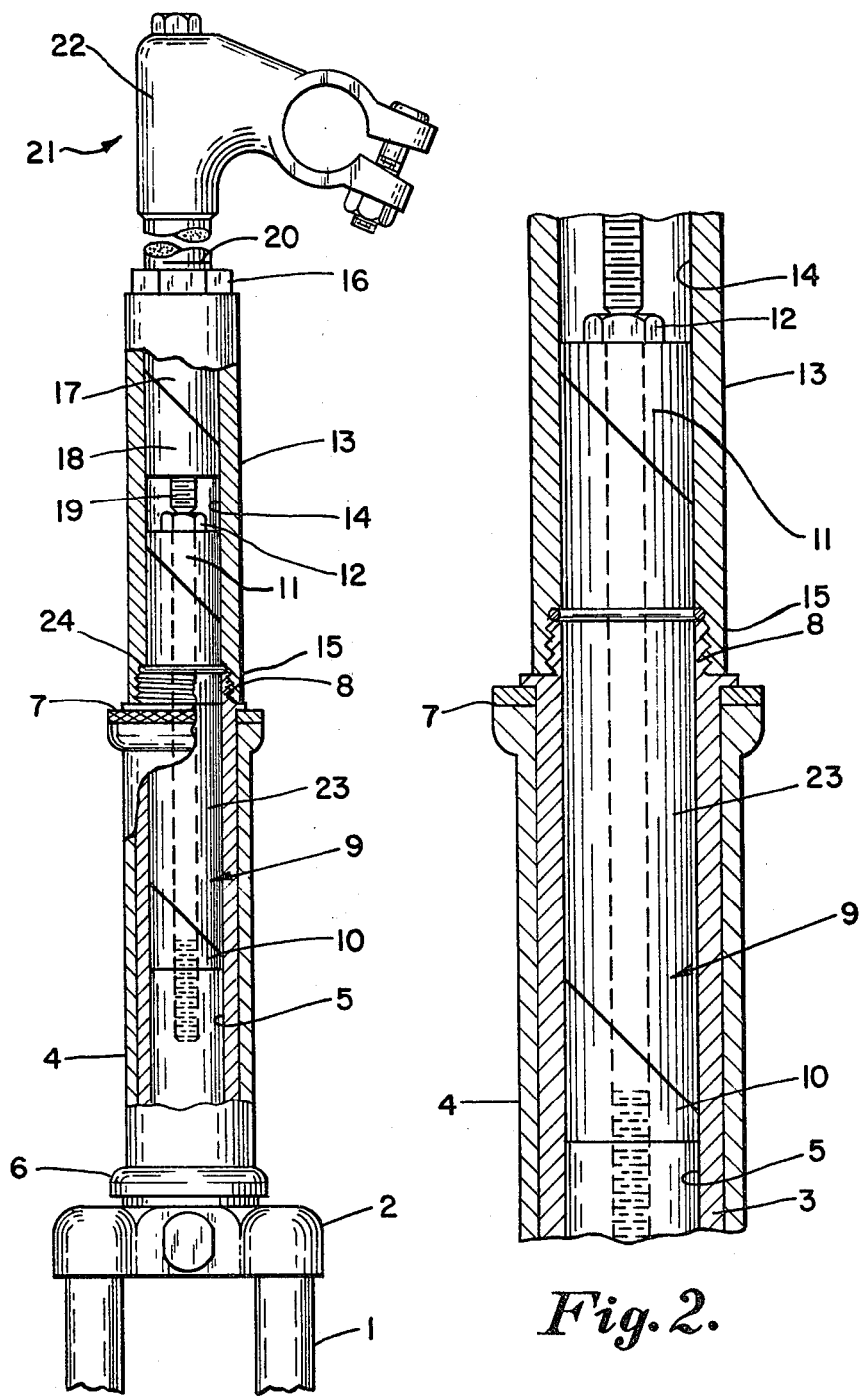

SHAFT ASSEMBLY FOR EXTENDING THE HEIGHT OF THE STEM OF A BICYCLE FORK

BACKGROUND OF THE INVENTION

Bicycles are made in a wide variety of frame sizes which are constructed to accommodate the different body structures of the potential user. To some extent, each bicycle frame provides adjustability to fit the particular height and size of the rider. For example, the height of the seat may be adjustable up and down to accommodate growth or riders of different heights. Similarly, but to a lesser extent, the handle bars may be adjusted by raising and lowering the neck within the fork stem. The handle bar adjustment is limited by the height of the fork stem and this leads to problems especially where the bicycle is used by a person still in his growing years. Although it may be possible to accommodate the growth by raising the seat, the handle bar neck cannot be raised correspondingly. This results in an imbalance and an awkward rider position which eventually renders the bicycle unusable.

It is, therefore, the purpose of this invention to provide an increased height adjustability for the handle bar neck by increasing the height of the fork stem.

SUMMARY OF THE INVENTION

The apparatus of this invention involves a cylindrical extender shaft having an axially extending passage within. One end of the passage is threaded on its inner circumference to engage the threads of the stem of a bicycle fork. The extender shaft passage and the passage of the fork stem have a similar diameter and are aligned. A reinforcing rod is inserted into the aligned passages and is locked into frictional engagement with both the extender shaft and the stem by means of lugs at its upper and lower ends. The top of the extender shaft is designed to receive the standard handle bar neck.

DESCRIPTION OF THE DRAWING

The invention is described in more detail below with reference to the attached drawing in which:

FIG. 1 is an illustration of a complete handle bar and fork assembly with a cutaway view of the neck extender assembly of this invention; and FIG. 2 is a cross section view of the frame head and neck extender assembly of this invention.

DETAILED DESCRIPTION OF THE PREFERRED EMBODIMENT

A typical front assembly of a bicycle is shown in FIG. 1 and consists of fork 1, frame head 4, and handle bar neck 21.

Fork 1 is a welded or otherwise integral structure which includes a crown 2 and a stem 3. Stem 3 is formed with threads at its upper end 8 and is constructed with an interior axial passage 5 which is designed to receive the neck 21. The front wheel of the bicycle is mounted on the fork as is well known.

Frame head 4 is tubular and fits over the fork stem 3 and is rotatably mounted on bearings (not shown) secured by lower and upper endcaps 6 and 7 respectively.

Neck 21 consists of a handle bar mounting bracket 22 and shaft 17. Shaft 17 is inserted in stem passage 5 and is secured by lug 18 which is actuated by bolt 19. In order to insure proper strength in the neck assembly, there is generally provided a safety line as at 20 which is used as a reference to determine maximum safe extention of the neck shaft 17 from the stem passage 5. This is indicative of the limited adjustability of the handle bar neck.

In order to extend the fork stem 3, a cylindrical extender shaft 13 is provided. Shaft 13 is constructed with an axial interior passage 14 having an inner diameter identical to that of stem passage 5. Passage 14 is formed with interior threads at its lower end 15 which engage the external threads on the upper end 8 of fork stem 3. Flats 16 are machined at the upper end of extender shaft 13 so that the shaft may be tightened onto fork stem 3 with the aid of a wrench.

Although the handle bar neck shaft 17 may be inserted directly into the extender shaft passage 14 and the desired increase in handle bar extention achieved, it is believed essential for safety reasons, that a reinforcing rod be inserted first to strengthen the junction of the extender shaft 13 and the fork stem 3. This is accomplished by providing an extender rod 9 which consists of a body 23 and lower and upper lugs 10 and 11 respectively. The lugs 10 and 11 are adjustably mounted to the body 23 by an axially positioned locking bolt 12 which extends through a central passage within the body. The mating interface between the body 23 and lugs 10 and 11 are slanted as shown so that, as the bolt is tightened, the lugs are forced into a slightly eccentric position. This results in a firm frictional engagement between the lugs and the interior wall of fork stem passage 5 and extender shaft passage 14. The reinforcing rod 9 is inserted into the axially aligned passages 14 and 5 and adjusted into position by tapping through the passage 14. For best results, the reinforcing bar should substantially fill the axial passages in the circumferential dimension. In order to maintain the rod 9 in position while allowing the final adjustment, an O-ring 24 is placed over the circumference of body 23. The O-ring 24 frictionally holds the rod 9 at the top of fork stem 3, while allowing it to be tapped into position within stem passage 5. The most effective position appears to be where the rod 9 spans the junction of elements 3 and 13. Once in position, the locking bolt 12 is tightened thereby actuating lugs 10 and 11 into locking engagement with the extender shaft 13 and fork stem 3. This assembly provides an extremely strong extension of the fork stem 3 and the handle bar neck may be inserted and adjusted for safe operation as is well known.

Other types of locking lugs are available. For example, a lug having a truncated conical shape (not shown) which fits into slotted tubular ends of body 23 of reinforcing rod 9 could be used. In this instance, tightening of the locking bolt 12 would result in an expansion of the slotted ends of body 23 into engagement with the interior surfaces of extender shaft passage 14 and stem passage 5.

In this manner a very simple and easy to use device is provided for reliably extending the fork stem of a bicycle. This invention allows a much greater range of utility for each of the standard size bicycle frames because the handle bars may now be safely raised in correct correspondence to the adjustment of the seat.

I claim as my invention:

1. In a bicycle comprising in part:
   a fork structure having a tubular stem extending upward therefrom, said stem having external threads at its upper end and having an open interior axial passage;

a tubular frame head being mounted for rotation on the stem;

a handle bar neck having means to receive the handle bars and having a tubular shaft extending downward for insertion into the axial interior passage of the fork stem;

means to retain the fork structure, frame head, and handle bar neck in assembled relation;

means to extend the height of the fork stem comprising:

a tubular extender shaft having an open interior axial passage, said lower end of said passage being threaded to engage the threads of the form stem;

a reinforcing rod having a cylindrical body sized for insertion into the combined axial passage formed by the passages of the stem and extender shaft; and means mounted on the reinforcing rod and being operable after insertion to lock said rod into reinforcing position within said combined axial passage.

2. In a bicycle as described in claim 1 wherein the locking means for the reinforcing rod comprises:

a bolt extending axially through the body of the reinforcing rod; and upper and lower lugs mounted on the bolt and shaped to slide into engagement with the walls of the combined axial passage as the bolt is tightened.

3. In a bicycle as described in claim 2 wherein the lower lug is threaded to receive the lower end of the bolt and moves into tightened position as the bolt is turned.

4. In a bicycle as described in claim 1 wherein the locking means for the reinforcing rod comprises:

a bolt extending axially through the body of the reinforcing rod;

slotted tubular receptacles on the upper and lower end of the body of the reinforcing rod; and upper and lower lugs having a truncated conical shape and being mounted on the bolt in a manner that allows the lugs to engage the slotted receptacles as the bolt is tightened, thereby expanding the upper and lower ends of the reinforcing rod into engagement with the walls of the combined axial passage.

5. In a bicycle as described in claim 4 wherein the lower lug is threaded to receive the lower end of the bolt and moves into tightened position as the bolt is turned.

6. In a bicycle as described in claim 1 wherein means are provided to frictionally engage the body of the reinforcing rod to allow proper positioning of the rod prior to operation of the locking means.

7. In a bicycle as described in claim 1 wherein the reinforcing rod is locked into a reinforcing position in which it engages both the extender shaft and the fork stem.

8. In a bicycle as described in claim 6 wherein the frictional engaging means comprises an O-ring.

9. In a bicycle as described in claim 1 wherein the tubular extender shaft is provided with engagement means to allow said shaft to be tightened onto the stem by means of a tool.

10. In a bicycle as described in claim 9 wherein the tool comprises a wrench and the engagement means comprises flats machined on the external surface of the extender shaft.

* * * * *